UNITED STATES PATENT OFFICE.

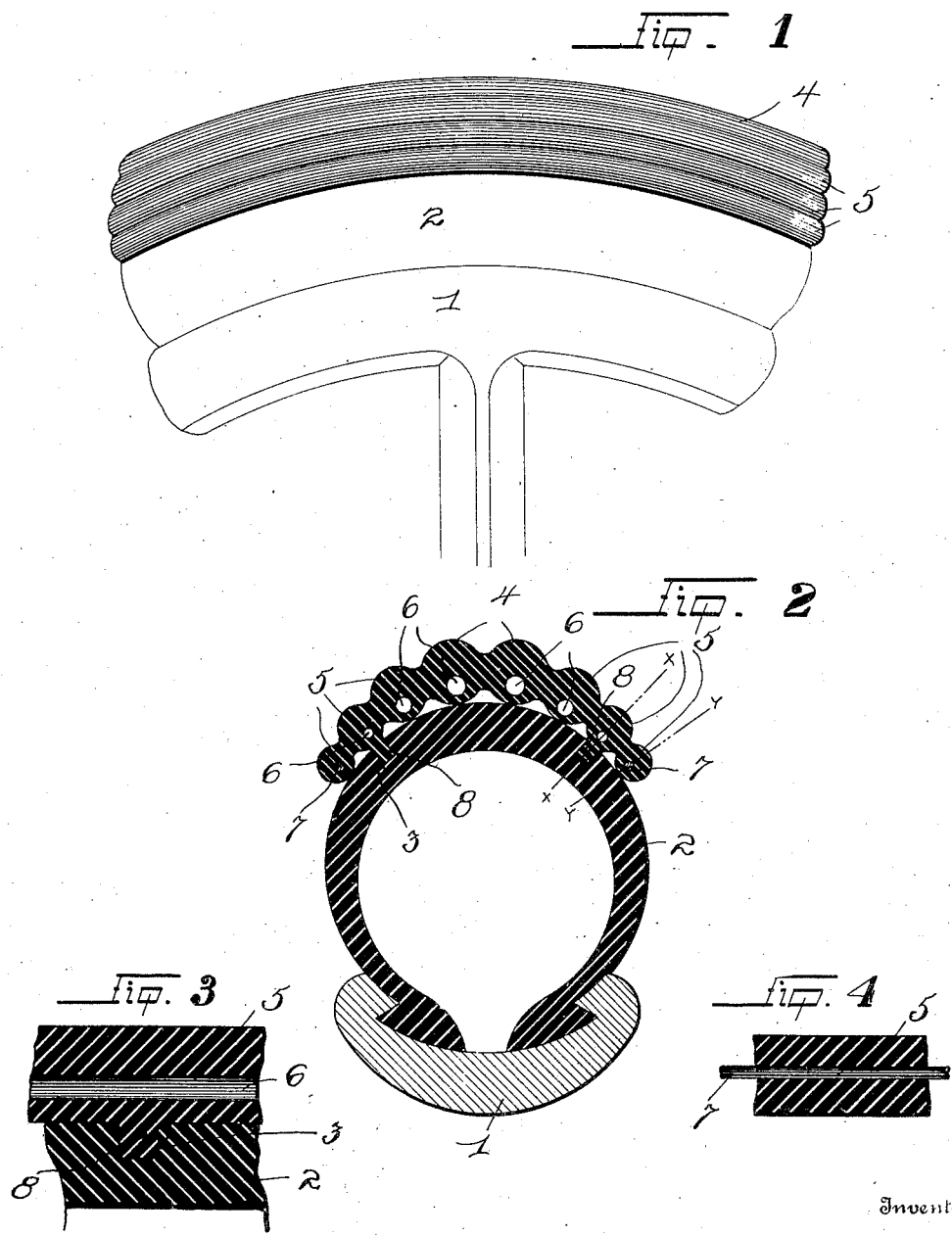

HARRY M. PITMAN, OF OAKLAND, CALIFORNIA, ASSIGNOR OF TWO-THIRDS TO IRA VAUGHAN, OF OAKLAND, CALIFORNIA.

DETACHABLE AUTOMOBILE-TIRE TREAD.

969,721.  Specification of Letters Patent.  Patented Sept. 6, 1910.

Application filed August 31, 1909. Serial No. 515,382.

*To all whom it may concern:*

Be it known that I, HARRY M. PITMAN, citizen of the United States, residing at Oakland, in the county of Alameda and State of California, have invented certain new and useful Improvements in Detachable Automobile-Tire Treads, of which the following is a specification.

This invention relates to inflatable tires, and the principal object of the same is to provide an armor which may be readily placed upon the tread surface of the tire to prevent puncturing the same and also to prevent skidding or slipping.

In carrying out the objects of the invention generally stated above, it will be understood, of course, that the essential features thereof are necessarily susceptible of changes in details and structural arrangements, one preferred and practical embodiment of which is shown in the accompanying drawing, wherein—

Figure 1 is a fragmentary view in side elevation of a wheel, the tire thereof being equipped with the improved protector. Fig. 2 is a vertical sectional view thereof. Fig. 3 is a sectional view taken on the line *x—x*, Fig. 2. Fig. 4 is a similar view taken on the line *y—y*, Fig. 2.

Referring to the accompanying drawings by numerals, 1 designates the wheel rim and 2 the usual inflatable tire therefor. Said tire has opposite longitudinal side portions of its tread surface provided with openings 3.

The improved tire protector is preferably formed of rubber and is longitudinally corrugated, the central ridges 4 of the corrugations being the larger ones and the side ridges 5 tapering therefrom, which arrangement gives the greatest thickness to the protector at its central portion. Each corrugation has a longitudinal opening 6 formed through it, said openings being preferably adjacent the inner portion of said corrugations. A wire 7 is passed through the openings of the two outer corrugations, said wires holding the protector in the proper shape to fit a tire. The ridge adjacent each outer ridge is provided, on its inner face, with lugs 8 which enter the openings 3 of the tread surface and serve to prevent the protector slipping relatively to the tire.

To apply the improved protector to a tire, the tire is deflated, and the protector placed over the tread surface thereof with the lugs 8 in engagement with the openings 3. The tire is then inflated which causes the protector to have a firm interlocking engagement with said tread surface.

It will be obvious that the openings through the corrugations of the protector materially cushion the same, said cushioning being increased by the air spaces formed by the inner surfaces of the corrugations and the tread surface of the tire.

From the foregoing, it will be seen that the ridges of the improved protector will engage with the roadbed in a manner to prevent skidding or slippage, in addition to preventing the tread surface of the tire being injured by punctures or the like.

What I claim as my invention is:—

1. A tire protector comprising a longitudinally corrugated body adapted to be detachably fitted over the tread surface of a tire, the ridges of said corrugated body tapering in relative thickness from the center of said body, and each ridge being provided with a cushioning opening.

2. The combination with a tire, of a protector having a longitudinally corrugated body the ridges of which taper in thickness from the center of the body, and means for holding said protector over the tread surface of said tire.

3. The combination with a tire having openings formed in its tread surface, of a protector for said tread surface, the body of which is longitudinally corrugated, the ridges of said corrugations being of greater thickness at the center of the body and decreasing in thickness toward the sides thereof, each ridge being provided with a longitudinal cushioning opening, wires passing through the openings of the outer ridges to hold said body in shape over a tire, and lugs projecting from the inner surface of two of said ridges and engaging with the openings in the tread surface of the tire.

In testimony whereof I affix my signature in presence of two witnesses.

HARRY M. PITMAN.

Witnesses:
 ELMER P. VAUGHAN,
 H. C. SCHROEDER.